United States Patent [19]
Ehsani et al.

[11] Patent Number: 5,448,149
[45] Date of Patent: Sep. 5, 1995

[54] INDIRECT ROTOR POSITION SENSOR FOR A SINUSOIDAL SYNCHRONOUS RELUCTANCE MACHINE

[75] Inventors: Mehrdad Ehsani, Bryan; Mohammed S. Arefeen, Houston, both of Tex.; Thomas A. Lipo, Middleton, Wis.

[73] Assignee: Texas A&M University, College Station, Tex.

[21] Appl. No.: 262,142

[22] Filed: Jun. 20, 1994

[51] Int. Cl.⁶ .............................................. H02P 7/00
[52] U.S. Cl. .................................... 318/701; 318/254
[58] Field of Search ............... 318/701, 700, 138, 439, 318/254, 685, 696, 801–812

[56] References Cited

U.S. PATENT DOCUMENTS

| | | | |
|---|---|---|---|
| 4,563,619 | 1/1986 | Davis et al. | 318/138 |
| 4,739,240 | 4/1988 | MacMinn et al. | 318/696 |
| 4,752,724 | 6/1988 | Radziwill et al. | 318/254 |
| 4,772,839 | 9/1988 | MacMinn et al. | 318/696 |
| 4,959,596 | 9/1990 | MacMinn et al. | 318/254 |
| 4,961,038 | 10/1990 | MacMinn | 318/696 |
| 5,001,405 | 3/1991 | Cassat | 318/254 |
| 5,015,939 | 5/1991 | Konecny | 318/701 |
| 5,072,166 | 12/1991 | Ehsani . | |
| 5,140,243 | 8/1992 | Lyons et al. | 318/701 |
| 5,291,115 | 3/1994 | Ehsani . | |

OTHER PUBLICATIONS

M. S. Arefeen, M. Ehsani and T. A. Lipo, "Sensorless Position Measurement in Synchronous Reluctance Motor," IEEE Transactions on Power Electronics, vol. 9, No. 6, pp. 624–630, Nov. 1994.

M. S. Arefeen and M. Ehsani, "An Analysis of the Accuracy of Indirect Shaft Sensor for Synchronous Reluctance Motor," IEEE Transactions on Industry Applications, vol. 30, No. 5, pp. 1202–1209, Sep./Oct. 1994.

M. S. Arefeen, M. Ehsani, and T. A. Lipo, "Indirect Startup Position Sensor for Synchronous Reluctance Motor," IEEE-APEC Conference (conference date Feb. 13–17 at Orlando, Fl.), Conference Proceedings, pp. 78–82, Feb. 13, 1994.

M. S. Arefeen, M. Ehsani, and T. A. Lipo, "An Analysis of the Accuracy of Indirect Shaft Sensor for Synchronous Reluctance Motor," IEEE-IAS Annual Meeting (meeting date Oct. 3–8, 1993 at Toronto, Ontario, Canada), Oct. 3, 1993.

M. S. Arefeen, M. Ehsani, and T. A. Lipo, "Elimination of Discrete Position Sensor for Synchronous Reluctance Motor," IEEE-PESC Conference (conference date Jun. 20–25, 1993 at Seattle, Washington), Conference Record, pp. 440–445, Jun. 20, 1993.

*Primary Examiner*—Jonathan Wysocki
*Attorney, Agent, or Firm*—Gunn & Associates

[57] ABSTRACT

A discrete position sensor elimination technique for a sinusoidally wound synchronous reluctance motor drive uses induced voltage, phase currents, and excitation frequency to estimate rotor position at all speeds, including zero speed.

7 Claims, 9 Drawing Sheets

INDUCED VOLTAGE IN PHASE A DURING THE START UP.

TIME

Fig. 16

DIAGNOSTIC CURRENT FLOWING THROUGH THE PHASES B AND C DURING THE START UP OPERATION.

TIME

INDIRECT ROTOR POSITION SENSOR FOR A SINUSOIDAL SYNCHRONOUS RELUCTANCE MACHINE

FIELD OF THE INVENTION

The present invention relates generally to the field of shaft or rotor position sensors in synchronous motors, and more particularly, to a method and apparatus for the determination of rotor position in a sinusoidal synchronous reluctance motor from the voltage induced in a stator phase.

BACKGROUND OF THE INVENTION

The present invention is directed to a specific reluctance motor referred to herein as a sinusoidal synchronous reluctance motor (SynRM). A sinusoidal synchronous reluctance motor is a synchronous machine with a well-defined salient pole rotor and a multi-pole stator excited by phased, sinusoidal currents. While such machines have been known for decades, recent advances in the manufacturing techniques for salient pole rotors and advanced current control techniques have only now made the power factor and efficiency of the machine competitive and consequently more attractive for a variety of applications.

Recent renewed interest in synchronous reluctance motors is mainly due to modern field oriented control strategies recently applied to these motors. In particular, it has been shown that a properly designed and field oriented SynRM can perform as well as an induction motor drive when the field weakening range is not too wide. On the other hand, the inherent characteristics of the SynRM make it preferable for some applications. For example, the stator of the SynRM is constructed from a cylindrical structure identical to an induction motor. Hence, the stator of both machines can be constructed from the same assembly line. Further, no starting cage is necessary with an inverter supply. The rotor can therefore be designed purely for synchronous performance.

The electronic control makes a SynRM auto-synchronous and can assure an optimum torque angle at all loads and torques, consequently giving the motor a very high pull-out torque. Also, no damping winding is necessary. This makes it possible to design the motor for the highest reluctance difference $X_d$-$X_q$, thereby increasing the power density of the machine. Finally, torque pulsations and acoustic problems are not as severe as those for variable reluctance machines and vector control techniques can be applied in order to achieve high performance.

However, like other ac machines, field orientation control of SynRM requires rotor position information. Particularly, high performance machines calling for torque control need such rotor position information.

A discrete rotor position sensor reduces the reliability and ruggedness of the drive and increases its cost. But, the SynRM possesses unique features which make position sensing much simpler and reliable than either conventional squirrel case induction machines or variable reluctance machines. In contrast to induction machines, the SynRM possesses saliency which permits the rotor position to be sensed since the inductance per phase is a function of rotor position. This allows sensing position at zero speed which is impossible for an induction machine. Secondly, in contrast to the variable reluctance motor, the stator windings of the SynRM are magnetically coupled. Hence, voltages are induced in the stator winding upon open circuit of a phase, which allows for sensing of the coupled voltage. These two features in combination make the task of sensing position easier than for either an induction or variable reluctance motor.

Thus, there remains a need for an indirect rotor position sensing technique and apparatus for a SynRM, utilizing only the input variables (voltages and phase currents) and the rotor saliency information. Further, there remains a need for a simple yet robust rotor position sensing technique that provides for sensing the rest position of the rotor (i.e., at no rotation) during startup operation. Such a rotor position sensing technique and apparatus should require no discreet, specially dedicated components, but rather should use available parameters, such as voltage and phase currents.

SUMMARY OF THE INVENTION

The present invention provides such a method and apparatus for determining rotor position using the mutual inductance of a synchronous machine. Power electronics techniques, involving pulse width modulation (PWM), are used to successfully produce adequate coupling voltages, even at zero speed, despite the fact that prior art study has made or assumed the mutual inductance between phases to be negligible or that the voltages caused by mutual couplings are too weak to be read accurately, especially at low motor speeds.

A variable speed motor drive has a power electronic converter connected to it anyway and thus the present invention can be implemented at no additional cost. Furthermore, prior art devices have suffered from the fact that coupled or other airgap voltages cannot be read off the motors whose phases are in continuous conduction (such as a synchronous reluctance motor). However, the power converter switching technique of the present invention provides a sampling window at the instant of the zero crossing of the current in a particular phase; the coupled voltage induced in the disconnected phase of interest can be read with any degree of accuracy required.

The coupled voltage, which is read from the motor, will have predictable rotor position angle information embedded in it. By knowing the relationship between this voltage and the rotor angle, it is possible to estimate the rotor position, which is required in all high performance adjustable speed motor drives. The sensing device of the present invention is particularly useful in motors used with slowly changing loads, such as pumps, compressors, fans, etc. For a slowly changing load, the rotor position information need not be continuous and thus, such drives can be implemented by measuring rotor position periodically. Rotor position can be measured at the zero crossings of the phase currents, which provides six samples every electrical cycle for a three phase motor.

The method and apparatus of the present invention is also useful as an indirect startup technique for a synchronous reluctance motor drive. For most ac machines, it is either impossible or at least very complicated to determine rotor position during startup operation. Thus, these motors operate in open loop until the motor induced voltage is large enough to be sensed. Also, the sensed voltage is often noisy and very difficult to sense. The synchronous reluctance motor, however, possesses unique features which make position sensing much simpler and more reliable, even at standstill. In contrast to induction machines, the SynRM has saliency which permits the rotor position to be sensed since the inductance per phase is a function of rotor position. This allows sensing position at standstill which is impossible for an induction motor. The present invention also provides an indirect startup rotor position sensing technique for a synchronous reluctance motor drive which involves use of electrical quantities at the motor terminals.

These and other objects and features of the present invention will be apparent to those of skill in the art from reading the following detailed description.

BRIEF DESCRIPTION OF THE DRAWINGS

FIGS. 11-16 depict waveforms of experimental results derived from tests of a machine built in accordance with the present invention.

DETAILED DESCRIPTION OF A PREFERRED EMBODIMENT

Mathematical Characterization of the Sinusoidal SynRM

Figure 1:
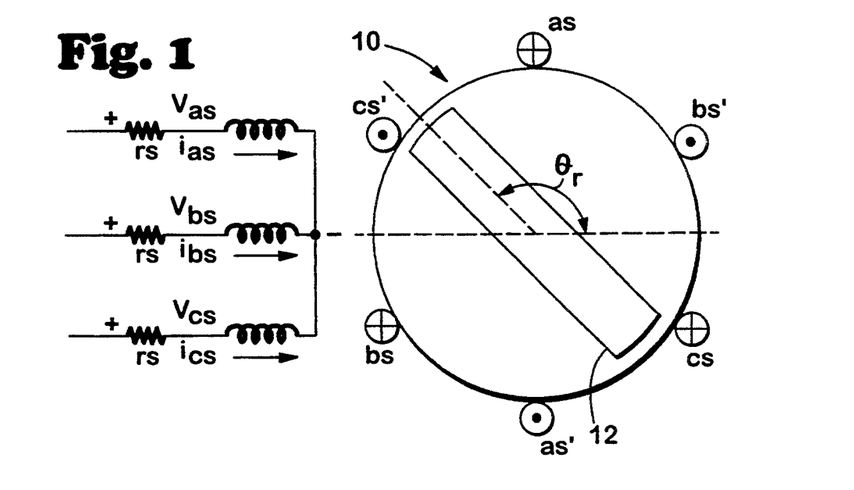
FIG. 1 is a schematic diagram of the stator and rotor configurations of the sinusoidal synchronous reluctance machine to which the present invention is applicable.

FIG. 1 schematically depicts a 2-pole, 3-phase, wye connected SynRM 10. The three phases, as, bs, and cs, with associated currents and voltages, are shown conventionally. The three phases of stator windings are shown schematically as as-as', bs-bs', and cs-cs' in the conventional manner.

A rotor 12 comprises an axially laminated rotor of the type described in Lipo, "Synchronous Reluctance Machine—A Viable Alternative for AC Drives?", Electric Machines and Power Systems, vol. 19, pp. 659-671, 1991, incorporated herein by reference.

The performance of this machine can be described by:

$$V_{as} = r_s i_{as} + \frac{d}{dt}(\lambda_{as}) \quad (1)$$

$$V_{bs} = r_s i_{bs} + \frac{d}{dt}(\lambda_{bs}) \quad (2)$$

$$V_{cs} = r_s i_{cs} + \frac{d}{dt}(\lambda_{cs}) \quad (3)$$

where $V_{as}$, $V_{bs}$, and $V_{cs}$ are the applied terminal voltages, as shown in FIG. 1, $r_s$ is the stator winding resistance, and $\lambda_{as}$, $\lambda_{bs}$, and $\lambda_{cs}$ are the flux linkages of the individual phases. The flux linkages can be expressed as:

$$\lambda_{as} = L_{aa}i_{as} + L_{ab}i_{bs} + L_{ac}i_{cs} \quad (4)$$

$$\lambda_{bs} = L_{ab}i_{as} + L_{bb}i_{bs} + L_{bc}i_{cs} \quad (5)$$

$$\lambda_{cs} = L_{ca}i_{as} + L_{bc}i_{bs} + L_{cc}i_{cs} \quad (6)$$

where the self and the mutual inductances of the machine can be written as:

$$L_{aa} = L_{ls} + L_A - L_B \cos 2\theta_r \quad (7)$$

$$L_{bb} = L_{ls} + L_A - L_B \cos 2\left(\theta_r - \frac{2\pi}{3}\right) \quad (8)$$

$$L_{cc} = L_{ls} + L_A - L_B \cos 2\left(\theta_r + \frac{2\pi}{3}\right) \quad (9)$$

$$L_{ab} = -\frac{1}{2}L_A - L_B \cos 2\left(\theta_r - \frac{\pi}{3}\right) \quad (10)$$

$$L_{ac} = -\frac{1}{2}L_A - L_B \cos 2\left(\theta_r + \frac{\pi}{3}\right) \quad (11)$$

$$L_{bc} = -\frac{1}{2}L_A - L_B \cos 2(\theta_r + \pi) \quad (12)$$

where $L_{mq} = 3/2(L_A - L_B)$ and $L_{md} = 3/2(L_A + L_B)$. Equations 4-6 show the coupling between different phases and equations 7-12 show the dependence of the mutual and self inductances on the rotor position, $\theta_r$. The technique of the present invention utilizes these facts to determine the rotor position as described below.

The Drive System

Figure 2:
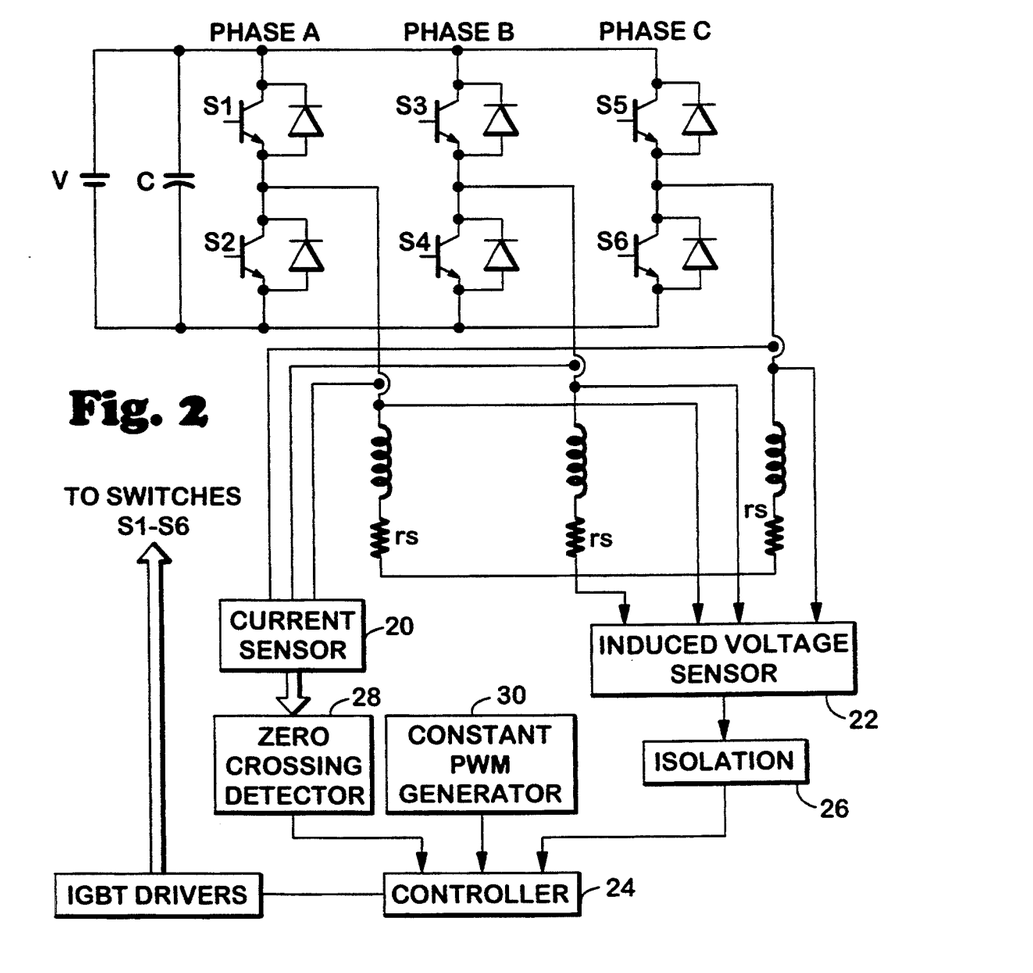
FIG. 2 is a schematic diagram of the motor drive and coupled power converter that includes the sensing technique of the present invention.

FIG. 2 depicts the complete drive system of the present invention. The drive system includes a voltage source V and a coupled parallel capacitor C. The power source is connected to a set of switches S1-S6, as shown. The wye-connected windings tap off the centerpoints between switches S1 and S2, S3 and S4, and S5 and S6.

Between the switches and the windings are two sets of sensors, currents sensors 20 and induced voltage sensors 22. The induced voltage sensors 22 are coupled to a controller 24 via an isolation circuit 26. The current sensors 20 are coupled to the controller 24 via a zero crossing detector 28 and constant PWM generator 30.

IGBT's are used as the power semiconductor devices and are driven by high voltage integrated circuit gate drivers, preferably FUJI EXB841. The controller is configured to take the induced voltage and the phase currents and generate the gate switching signals for the three phases. The remainder of the drive system consists of the induced voltage sensing circuit which is interfaced with the phase coils. Isolation of the sensing circuit from the power circuit is accomplished by using a high frequency isolation transformer. The control algorithm routinely measures the rotor angular positions and makes the drive self-synchronized by advancing or retarding the phase currents.

Figure 2A:
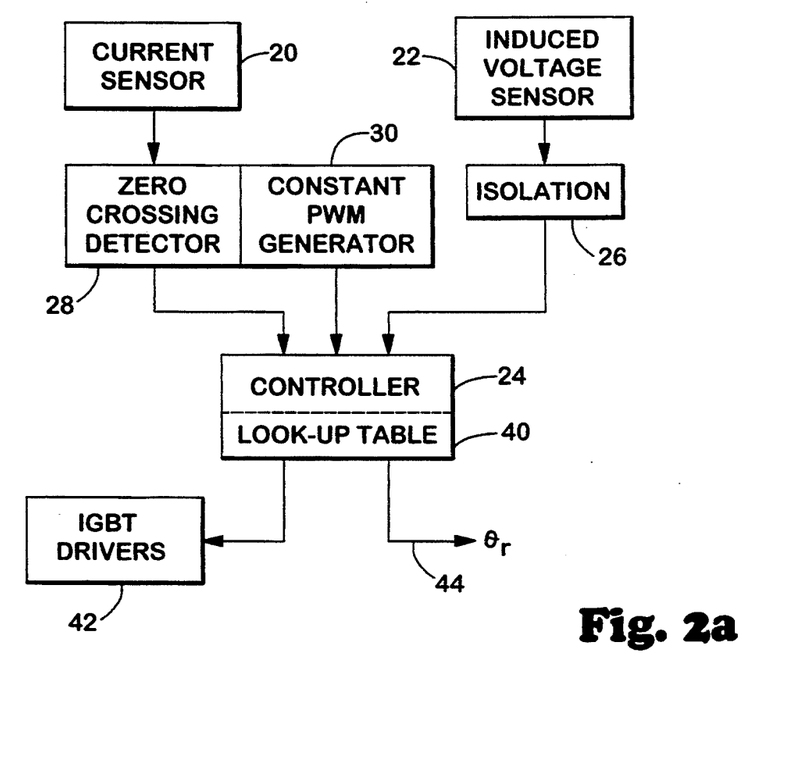
FIG. 2(a) is a detail of the schematic diagram of FIG. 2.

FIG. 2(a) depicts further details of the schematic of FIG. 2. Elements in common with those of FIG. 2 are similarly numbered. The controller 24 has stored therein the sinusoidal waveform that ultimately excites the windings of the stator, as described. In the present invention, the zero crossing detector recognizes when the current in phase A, for example, crosses zero amps. At that instant, the controller issues control instructions that open switches S1 and S2 to de-couple phase A from the excitation for a short period of time, referred to herein as a "window" or extended zero crossing. In this way, the current in phase A is zero and the voltage in phase A comes only from mutual inductance from phases B and C. Similarly, the controller 24 issues control instructions that open switches S4 and S5 to provide the current path shown in FIG. 3(a). Significantly, the phase current in phase B (and phase C) goes into constant PWM during the period of extended zero crossing. This provides the state during which the measurements can be made from which rotor position can be calculated, as described below.

In a preferred embodiment, the controller 24 includes on-board memory, a portion of which includes a look-up table 40. The look-up table 40 includes rotor-position calculation results to any accuracy desired, depending upon the memory space available. (A similar memory space stores the sinusoidal waveform for excitation of the motor.) The calculation results provide an output $\theta_r$ over an output line for such applications as torque/-speed control.

The Method of the Present Invention

The rotor position information embedded in the SynRM equations above is obtained using the drive circuit of FIG. 2. This technique uses a switching technique for the current-regulated pulsewidth modulated (CR-PWM) converter. In a known CR-PWM converter, the phase switches are normally turned on and off in order to make the individual phase currents follow the desired reference within a desired band.

Figure 3A:
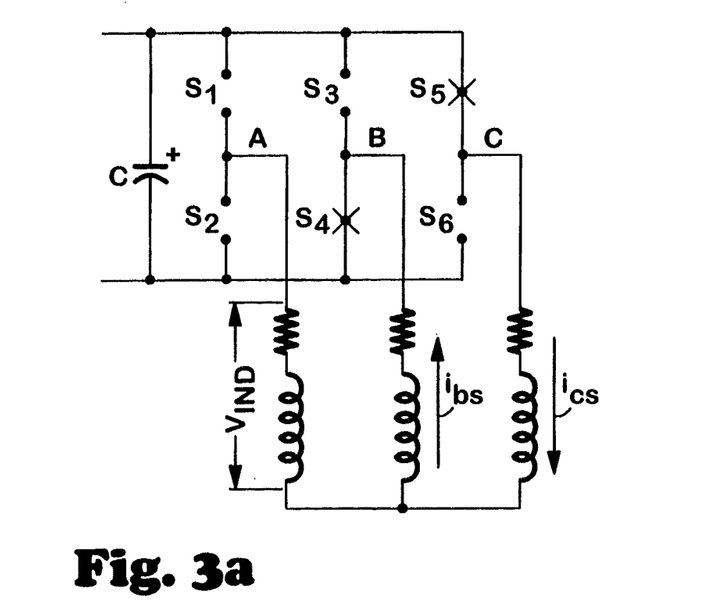
FIGS. 3(a) and 3(b) depict circuit configurations during the extension of a zero crossing period of one phase current.
Figure 3B:
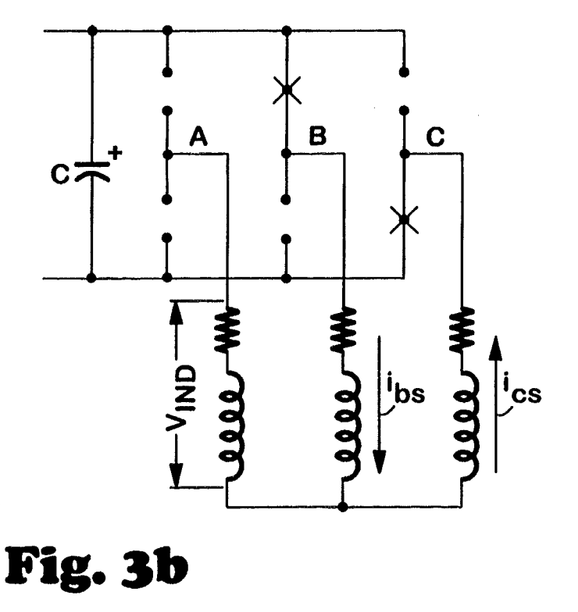

FIGS. 3(a) and 3(b) show the switching technique of the present invention. In this new switching technique, both switches of that phase are turned off when the current of a particular phase (e.g., phase A) crosses zero. The remaining two phases (in this case phases B and C) are excited in series by turning on alternate pairs of switches (the lower switch of phase B and the upper switch of phase C; FIG. 3(a)) or the lower switch of phase C and the upper switch of phase B (FIG. 3(b)).

This switching pattern will extend the zero crossing interval of phase A for a short interval. The currents in phases B and C can be controlled to follow a constant reference during this period. The description of this constant reference PWM of the phases B and C is explained below.

Although current of phase A during this extended zero crossing period will be zero, a voltage is induced in phase A due to the currents in the other two phases, which can be obtained by setting $i_{as}=0$ in Equation 1, above. Thus, $$V_{ind} = \frac{d}{dt} (L_{ab} i_{bs} + L_{ac} i_{cs}) \tag{13}$$

Since phase B and phase C are now effectively in series, $i_{bs} = -i_{cs}$ and $d/dt\ (i_{bs}) = -d/dt\ (i_{cs})$ and Equation 13 becomes $$V_{ind} = (L_{ab} - L_{ac}) \frac{d}{dt} i_{bs} + i_{bs} \frac{d}{dt} (L_{ab} - L_{ac}) \tag{14}$$

Using Equations 10 and 11, the induced voltage becomes:

$$V_{ind} = K_1 \sin(2\theta_r) + K_2 \cos(2\theta_r) \tag{15}$$

where, $$K_1 = -\left(2L_B \sin\frac{2\pi}{3}\right) \frac{d}{dt} i_{bs} \tag{16}$$

$$K_2 = -\left(4L_B \omega_r \sin\frac{2\pi}{3}\right) i_{bs} \tag{17}$$

In Equation 17, $\omega_r$ is the rotor speed in hertz, which is equal to the frequency applied to the stator divided by the number of pole pairs. Thus, by knowing the induced voltage $V_{ind}$, the slope and the instantaneous value of the current $i_{bs}$ and using $\omega_r$, yields by computation the instantaneous value of the rotor position.

Figure 4:
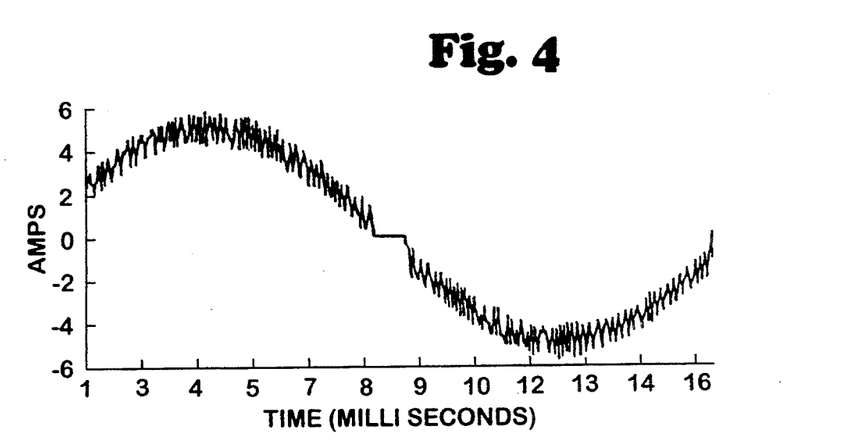
FIG. 4 is a plot of the current in phase A showing the extension of the zero crossing during a sampling period.
Figure 5:
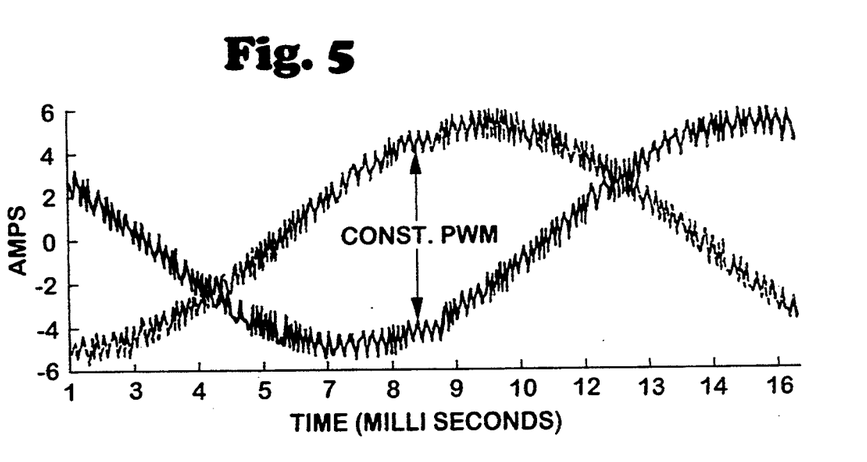
FIG. 5 is a plot of the currents in phases B and C during the same period as in FIG. 4 to show constant PWM during the extended zero crossing period of phase A.

FIG. 4 depicts the waveform of the phase A current of a SynRM drive wherein the zero crossing period of the phase A current is extended by applying the device of the present invention. During the extended zero crossing period of phase A current, phases B and C of the converter are switched in a special diagnostic manner for a short interval. This diagnostic switching interval consists of following a constant reference current, in each phase, by means of hysteresis control. The level of the constant reference currents in phases B and C are exactly the instantaneous values of these currents, respectively, at the instant of phase A current zero crossing, as shown in FIG. 5.

Figure 6:
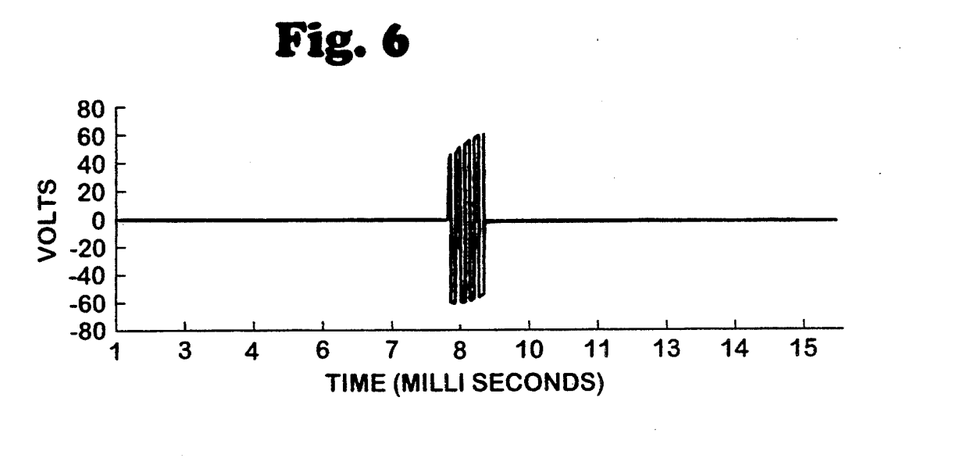
FIG. 6 depicts phase induced voltage during the constant PWM of FIG. 5 of phases B and C.
Figure 7:
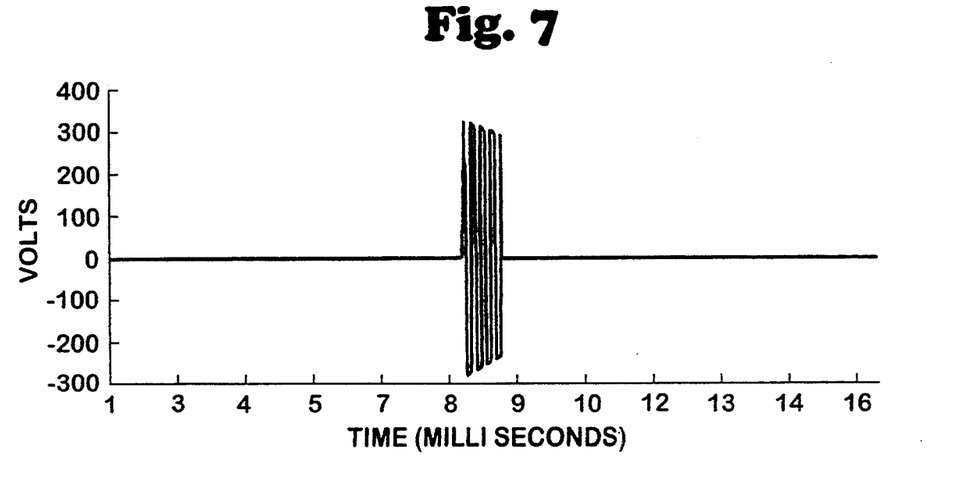
FIG. 7 depicts line-to-line induced voltage in phases A and C for the period of FIG. 6.

During this diagnostic PWM interval, the instantaneous slopes and the magnitudes of phases B and C currents become equal and opposite. The voltage induced in phase A due to the currents flowing through phases B and C is shown in FIG. 6. The sequence of coupled voltage pulses, shown in FIG. 6, has the instantaneous rotor angle encoded in their amplitudes, according to Equation 15. Each individual pulse amplitude sample can deliver one rotor angle sample by use of a look-up table. The table contains the inverse function of Equation 15, solved for $\theta_r$, in discrete form. Thus, several samples of the rotor angle are obtained during each diagnostic PWM interval.

These samples can be used for two purposes. The multiple samples can be used in an error reduction and noise elimination algorithm. The change of $\theta_r$, from sample to sample can also be used to enhance speed and rotor angle extrapolation algorithms between two zero crossings when the change of speed is very high, such as during start-up. Also, the mathematical analysis (Equations 4–12) is only used to show the background of the present invention. In practice, the actual measurements of voltages, currents, rotor angles, etc., from the motor are used to create the look-up table. Thus, the non-ideal variations, of the actual machine parameters, from the theory will be accounted for in the look-up table.

Although the proposed technique has been described only for phase A, the same technique can clearly be applied for phases B and C. Thus, for the six zero crossings within one electrical cycle of a three phase machine this technique gives six rotor position measurements. Therefore, extrapolation technique has to be applied in order to estimate rotor positions between two zero crossings. A linear extrapolation will be sufficient to estimate rotor positions during the constant speed operation of the drive. But, during the acceleration period of the drive, linear extrapolation will introduce errors in rotor position estimation. Thus, acceleration of the drive has to be limited so that the rotor estimation error between two zero crossings does not exceed a predefined error margin. If the individual sample error $\Delta\theta_{sample}$ at each zero crossing, is taken as the acceptable margin of error for extrapolation between two zero crossings, then the acceleration, a, of the drive is limited by, $$a \leq 72 \cdot \Delta\theta_{sample} \cdot f_e^2$$

where $f_e$ is the electrical frequency of the drive.

The zero crossing window of phase A current, FIG. 4, has been made longer than necessary in order to illustrate the concept of the new switching technique. This extension of the zero crossing period of one phase and constant PWM of the remaining two phases will introduce lower order harmonics in the stator currents. However, in a practical implementation of a SynRM drive this zero crossing window will be much smaller than shown here because a very high frequency PWM will provide the required number of voltage pulses as shown in FIG. 6 within a very short interval and consequently the zero crossing windows can be made very small. A small zero crossing window will ensure less torque pulsations as well as insignificant lower order harmonics introduced in the stator currents. Lower order harmonics introduced because of a 200 μsec window (which is enough to record the required voltage pulses using the microcontroller INTEL 196KR) are insignificant compared to the fundamental component of the stator current which can be seen from the following tables giving the ratio between fundamental and harmonic currents.

TABLE 1

| Harmonics in phase A current | |
| --- | --- |
| Harmonic No. | Fund./Harm (%) |
| 2 | 2.5 |
| 3 | 2.4 |
| 4 | 1.6 |
| >5 | <1.5 |

TABLE 2

| Harmonic in phases B & C Current | |
| --- | --- |
| Harmonic No. | Fund./Harm (%) |
| 3 | 1.7 |
| 5 | 1.6 |
| 7 | 1.5 |
| >9 | <1.3 |

In one aspect, the present invention calls for access to the center point of the stator of the machine. This requirement can be avoided with a simple modification of the switching technique. When the center point is not available, the controller will read the induced voltage between phase A and either of the remaining two conducting phases. It is possible to formulate the induced voltage expression similar to Equation 14 for this modified form of switching. In the example shown in FIG. 6, the induced voltage is measured between the phases A and C. Pulses of the coupled voltages shown in FIG. 6 contain the rotor position information.

Rotor Position at Zero Speed

The method of the present invention can determine the rotor position even at zero speed. At zero speed all phase currents are zero. In this state, diagnostic PWM signals may be induced on any pair of phases while the current in the other phase is controlled at zero current. The additional advantage is that the zero crossing can be made to persist for as long as one wishes the diagnostic interval to be. Furthermore, the speed term $$i_{bs} \frac{d}{dt} (L_{ab} - L_{ac})$$

in Equation 14 is eliminated in the look-up table for $\theta_r$, which can now be derived from:

$$V_{ind} = (L_{ab} - L_{ac}) \frac{d}{dt} i_{bs} \qquad (19)$$

Figure 8:
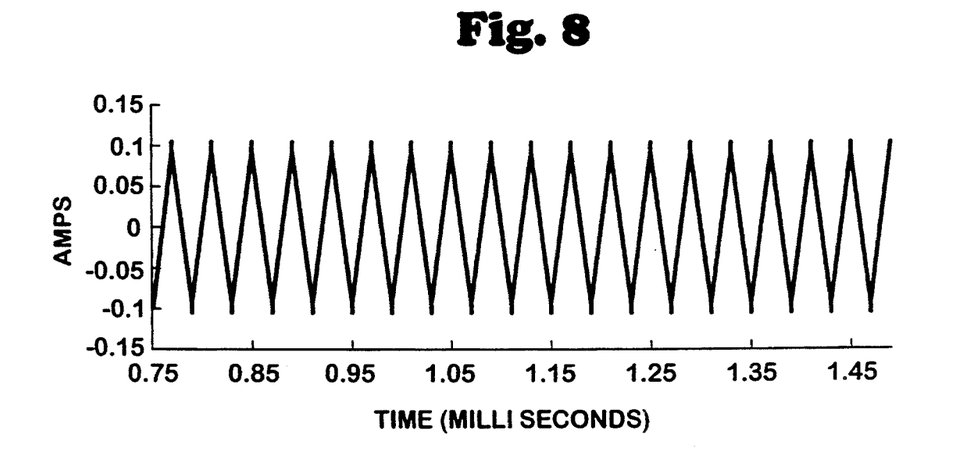
FIG. 8 depicts the current through phases B and C when the induced voltage is measured across phase A at zero speed.

FIG. 8 depicts the diagnostic current of phases B and C during the induced voltage measurement of phase A at zero speed.

Viewed in another way, the induced voltage can be expressed as:

$$V_{ind} = -2L_B \sin \frac{2\pi}{3} \sin 2\theta_r \frac{d}{dt} i_{bs} \qquad (20)$$

Thus, the induced voltage is dependent only upon $\theta_r$, the rotor position, the slope of the impressed diagnostic current, and physical characteristics of the motor. Similar equations can be developed for the other two stator phase pairs.

Figure 9:
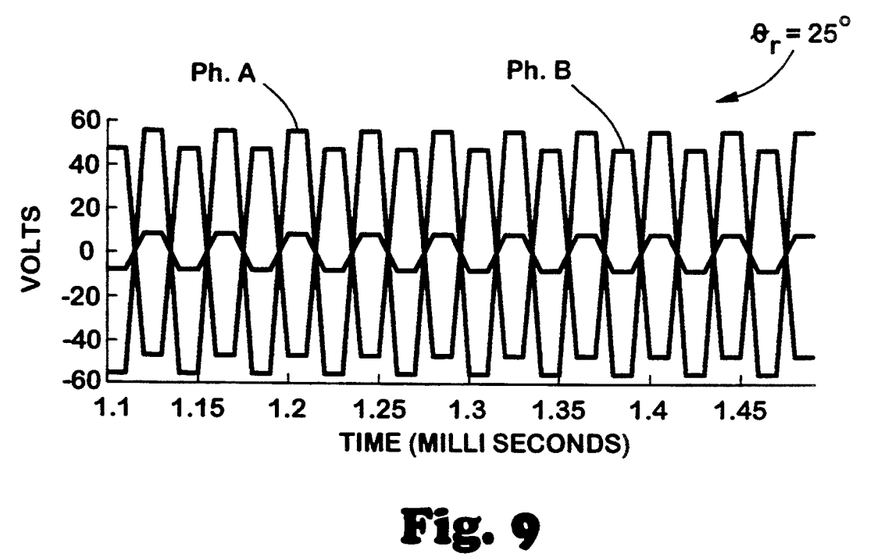
FIG. 9 and 10 depict induced voltages at zero speed for different rotor angles, FIG. 9 and 25 degrees, and FIG. 10 at 205 degrees.
Figure 10:
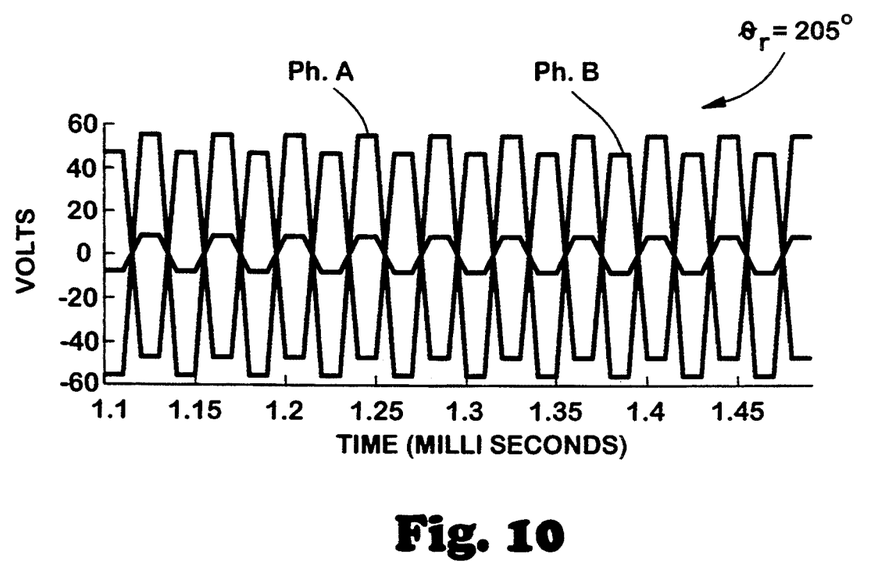

The coupled voltage induced in phase A has the rotor angle encoded in its amplitude (See FIGS. 9 and 10). This induced voltage amplitude can be used to estimate the startup rotor position, b using a look-up table. The table contains the inverse function of equation 20, solved for $\theta_r$, in discrete form.

To determine the rotor position uniquely, the induced voltages from all three phases have to be read. Induced voltage for phase A should be read by diagnostically energizing phases B and C. Similarly the induced voltages of phases B and C should be read by diagnostically energizing the remaining two phases. The induced voltages for three phases (with the rotor at 25 mechanical degrees) are shown in FIG. 9.

The phase inductance of a SynRM is a function of twice the rotor angle $\theta_r$, i.e., $2\theta_r$. Hence, for every electrical cycle the phase inductance goes through two cycles. For this reason, the induced voltages at 205 mechanical degrees (FIG. 10) are the same as those shown in FIG. 9.

This apparent problem is insignificant since the rotor of a SynRM has no preferred polarity due to the absence of any winding on the rotor. During startup operation, the controller can be set to pick the lower or the higher angle.

Experimental Results

To prove the efficacy of the foregoing, a synchronous reluctance machine employing the present invention was built and tested. As previously mentioned, the machine used an axially laminated rotor and the stator was a standard configuration for a 7.5 hp three phase induction machine.

Figure 11:
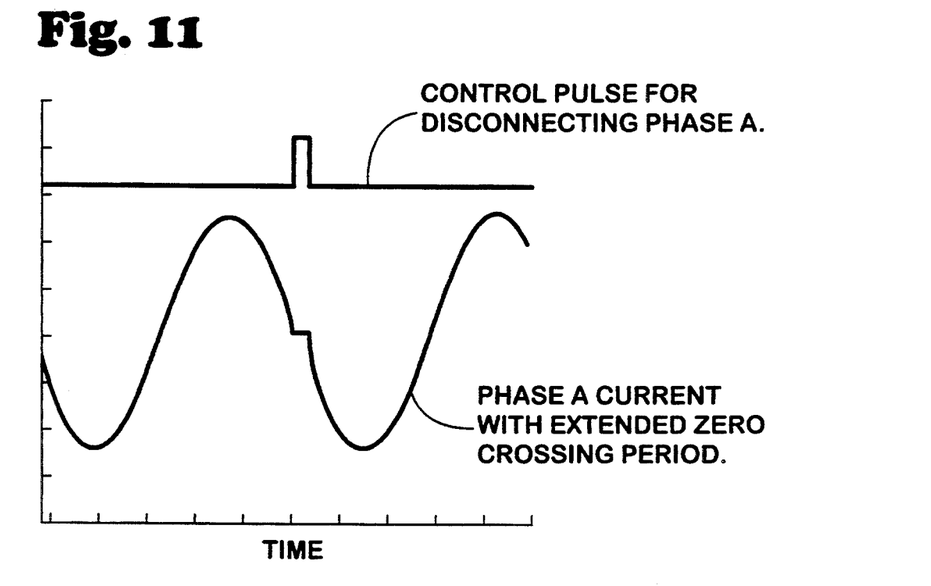
FIG. 11 depicts phase A current with an extended zero crossing period.
Figure 12:
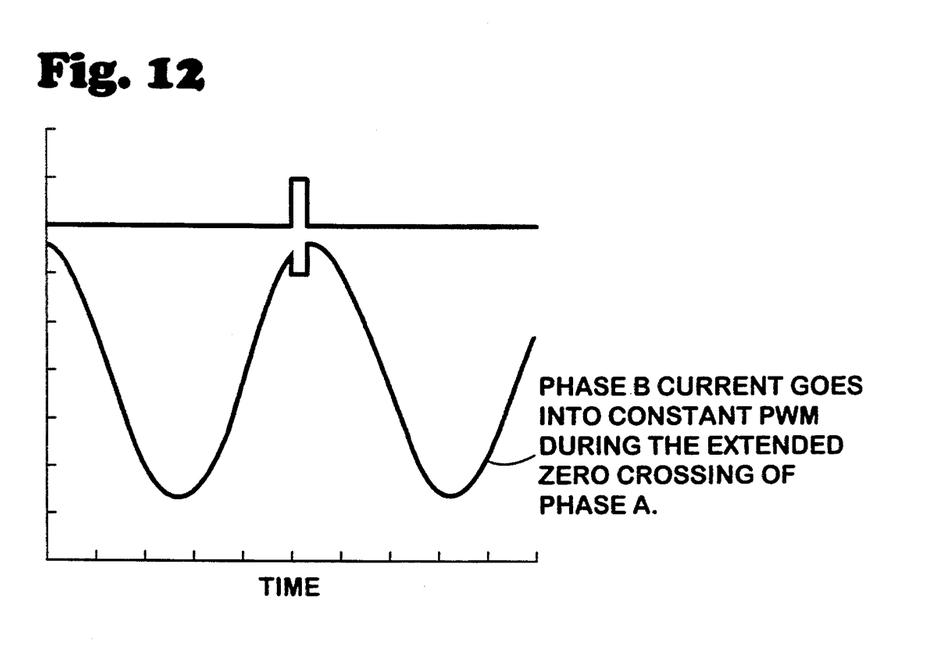
FIG. 12 depicts phase B current during the period shown in FIG. 11.
Figure 13:
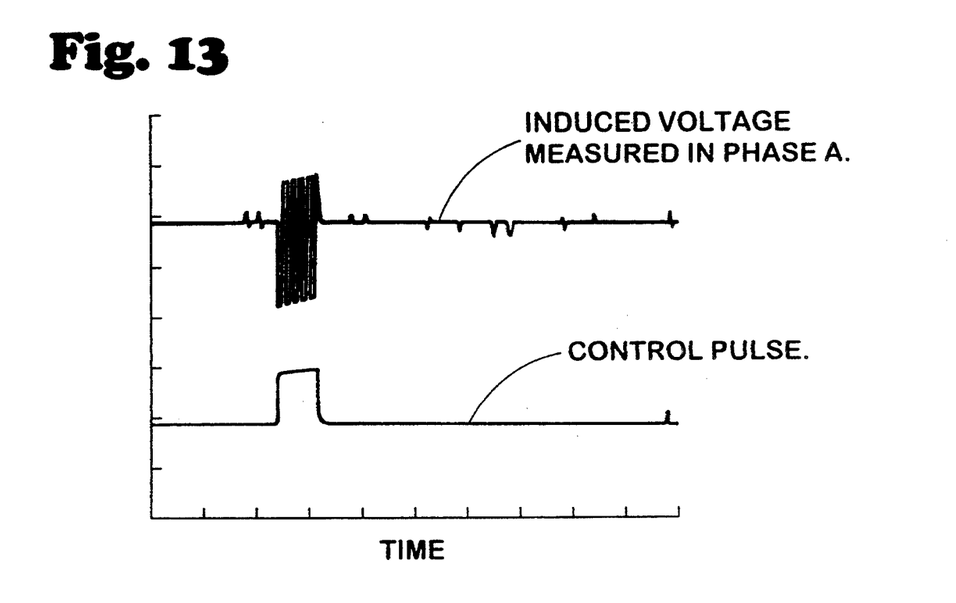
FIG. 13 depicts induced voltage in phase A.
Figure 14:
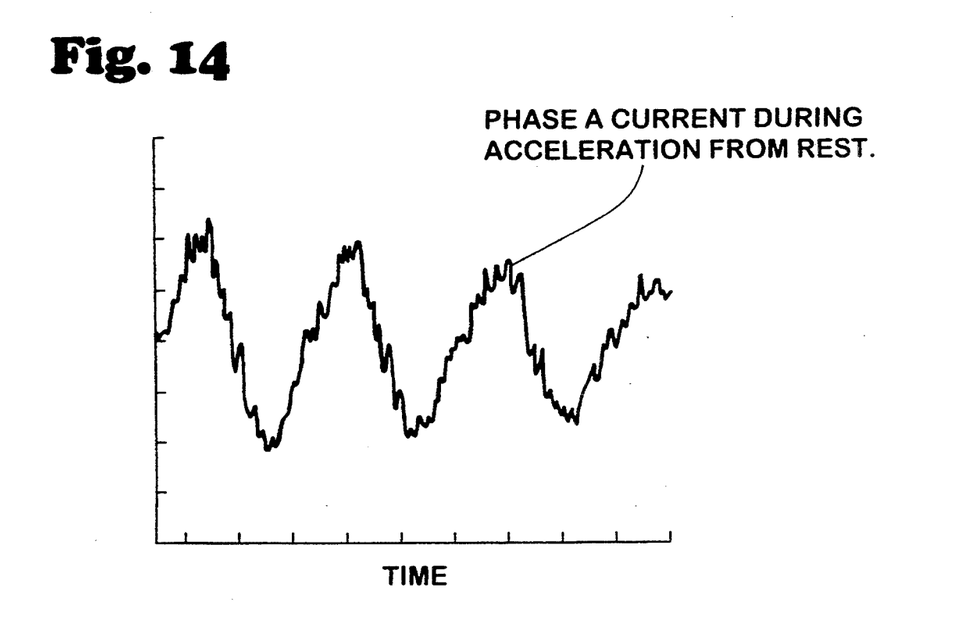
FIG. 14 depicts phase A current during acceleration from rest.
Figure 15:
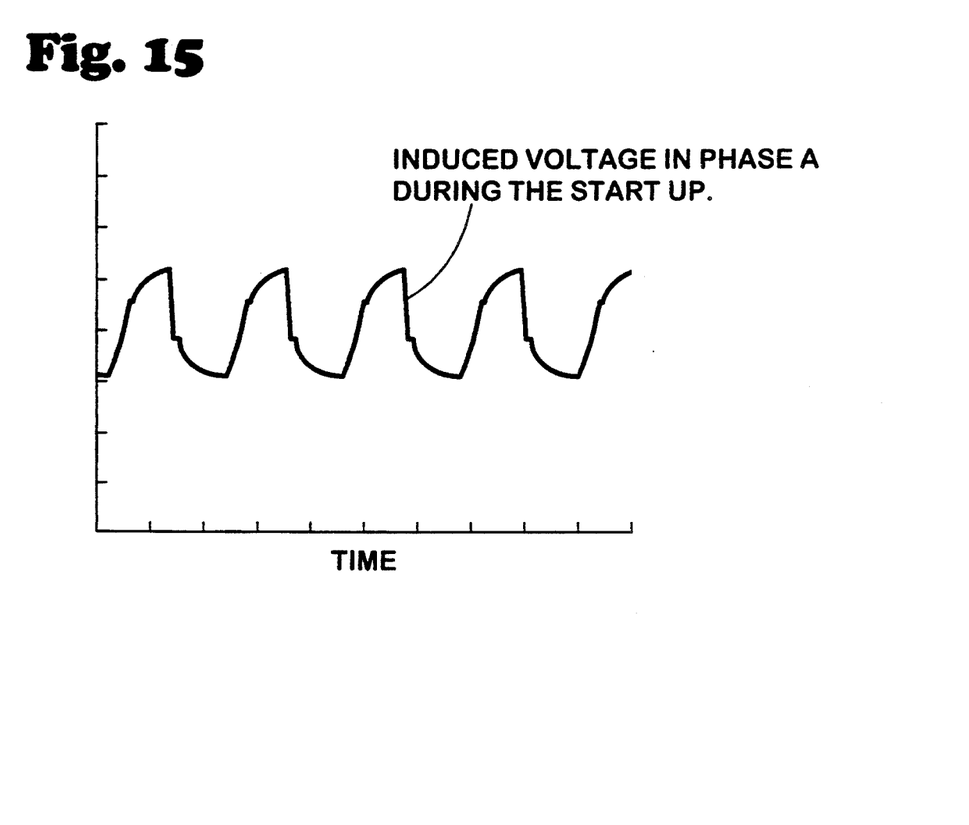
FIG. 15 depicts induced voltage in phase A during start up.
Figure 16:
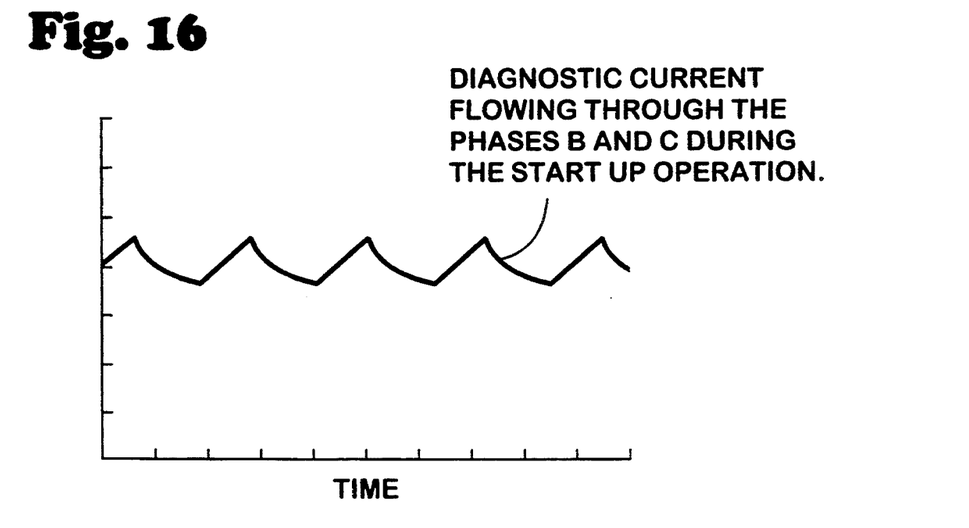
FIG. 16 depicts diagnostic current through phases B and C during startup.

Throughout these tests, the SynRM operated at 1000 RPM under a lightly loaded condition. FIG. 11 shows a measured trace of the phase A current with the extended zero crossing period corresponding to FIG. 4. The zero current interval is shown, in this case only one per cycle. FIG. 12 shows the constant current PWM interval of the phase B current during that extended zero crossing period of phase A. FIG. 13 shows the induced voltage measured in phase A. FIG. 14 shows the phase A current during acceleration of the motor from rest. Only one zero crossing window was created at every electrical cycle of the phase current. During the tests, the experimental drive was made self synchronized by advancing or retarding the phase currents depending on the rotor position. In order to calculate the starting rotor position, two phases were diagnostically energized and the induced voltage was read across the third phase. FIG. 16 shows the diagnostic constant current regulation flowing through the phases B and C of the experimental drive. FIG. 15 shows the voltage induced across phase A during this diagnostic interval. A strong, easily measurable signal is clearly evident. The accuracy of the individual rotor samples at the zero crossings of the phase currents can be obtained from the following expression, $$\Delta\theta_r = \frac{\partial\theta}{\partial V_{ind}} \frac{V_{max}}{2^n} + \frac{\partial\theta_r}{\partial K_1}\left(-8L_B\sin\frac{2\pi}{3} f_s \frac{I_{max}}{2^n}\right) + \frac{\partial\theta_r}{\partial K_2}\left(-4L_B\omega_r\sin\frac{2\pi}{3} \frac{I_{max}}{2^n}\right) \quad (21)$$

where $\Delta\theta_r$ is the error in rotor position estimation, $V_{max}$ is the maximum measured induced voltage, $I_{max}$ is the maximum phase current, $F_s$ is the PWM switching frequency during the extended zero crossing period of the phase current and n is the number of output bits of the A/D converter. The maximum $\partial\theta_r/\partial V_{ind}$, $\partial\theta_r/\partial K_1$ and $\partial\theta_r/\partial K_2$ was found analytically maximizing them in the possible range of the three dimensions, i, $i^o$ and $V_{ind}$. The worst case position error was found by substituting system parameters $L_B$, n, $V_{max}$, $I_{max}$ in Equation 21 and the error was found to be equal to or less than 0.80 mechanical degrees. The acceleration of the drive must be, $$K \leq 72 \cdot \Delta\theta_{sample} \cdot f_e^2 \quad (22)$$

in order to keep the estimation error between two zero crossings within $\Delta\theta_{sample}$ (here, $\Delta\theta_{sample}=0.80$ mechanical degrees). The above mentioned analysis technique can be applied at zero speed to obtain the accuracy of the startup rotor position estimation. At zero speed the rotor position estimation error, $\Delta\theta_{ro}$, can be written as, $$\Delta\theta_{ro} = \frac{\partial\theta_{ro}}{\partial V_{ind}} \frac{V_{max}}{2^n} + \frac{\partial\theta_{ro}}{\partial i^o} \Delta i f_{so} \quad (23)$$

where, $i^o \equiv di/dt$ and $f_{so}$ is the diagnostic frequency of two stator phases when the induced voltage is measured across the remaining third phase. At zero speed, the error was found to be equal to or less than 0.50 mechanical degrees.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method of detecting rotor position in a rotating sinusoidally excited synchronous reluctance electric machine having multiple stator phases which are energized by sinusoidal currents at an excitation frequency in all phases comprising the steps of:
    interrupting the excitation to a first phase at a zero crossing for that phase current for a predetermined period of time to create a zero crossing window thereby enabling the reading of the induced voltage in the disconnected phase;
    simultaneously coupling the other phases to sinusoidal excitation for the same period of time;
    reading the induced voltage in the first phase;
    detecting the phase currents in the other phases; and
    calculating the rotor position from the read induced voltage, detected phase current, and the excitation frequency.

2. A method of determining rotor position in a sinusoidally excited, multi-phase synchronous reluctance machine at stand-still, comprising the steps of:
    energizing a phase pair with a diagnostic signal to develop a diagnostic current;
    detecting the diagnostic current;
    determining the rate of change of the diagnostic current to determine the slope of the diagnostic current;
    reading the induced voltage off another phase; and
    using the read induced voltage and the slope of the diagnostic current to determine the rotor position at stand-still.

3. A device for determining the position of a rotor in a rotating, sinusoidally excited synchronous reluctance machine comprising:
    a. a plurality of switches for selectively coupling the stator windings to a source of sinuosidal electrical excitation;
    b. a driver to selectively de-couple one phase of the stator windings from the source of excitation and to couple the remaining phases of the stator windings to the source of excitation;
    c. a voltage sensor to sense the voltage induced in the stator windings de-coupled from the source of excitation and to output a sensed voltage;
    d. a current sensor to sense the current in the coupled windings and to output a sensed current;
    e. means for determining the rate of change of the current sensed by the current sensor and to output a current slope;

f. means for determining the frequency of rotation of the rotor; and g. means for determining the rotor position from the sensed voltage, the sensed current, the current slope, and the frequency of rotation.

4. The device of claim 3 wherein the means for determining rotor position comprises a controller including a look-up table with a plurality of rotor position determinations stored therein.

5. Apparatus for determining rotor position in a multi-phase sinusoidally excited synchronous reluctance machine at stand-still, comprising:

a source of excitation for energizing a phase pair with a diagnostic signal to develop a diagnostic current;

a current sensor for detecting the diagnostic current;

means for determining the rate of change of the diagnostic current to determine the slope of the diagnostic current;

a voltage sensor for detecting the induced voltage off another phase; and a processor for determining the rotor position at stand-still using the read induced voltage and the slope of the diagnostic current.

6. The apparatus of claim 5 wherein the processor includes a controller including a look-up table with a plurality of rotor position determinations stored therein.

7. A device for determining the position of a rotor in a rotating, sinusoidally excited, multi-phase, synchronous reluctance machine comprising:

a. means for interrupting the excitation in a first phase of the stator windings to develop a zero-crossing window;

b. a voltage sensor to sense the voltage induced in the stator windings in the first phase;

c. a current sensor to sense the current in another phase;

d. means for determining the rate of change of the current sensed by the current sensor and to output a current slope;

e. means for determining the frequency of rotation of the rotor; and f. means for determining the rotor position from the sensed voltage, the sensed current, the current slope, and the frequency of rotation.

* * * * *